(12) United States Patent
Wei et al.

(10) Patent No.: US 10,530,909 B2
(45) Date of Patent: Jan. 7, 2020

(54) HOUSING ASSEMBLY, DUAL-CAMERA MODULE AND MOBILE TERMINAL

(71) Applicant: GUANGDONG OPPO MOBILE TELECOMMUNICATIONS CORP., LTD., Dongguan, Guangdong (CN)

(72) Inventors: Yi Wei, Guangdong (CN); Yong Li, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/529,447

(22) Filed: Aug. 1, 2019

(65) Prior Publication Data

US 2019/0356764 A1 Nov. 21, 2019

Related U.S. Application Data

(63) Continuation of application No. 15/802,697, filed on Nov. 3, 2017, now Pat. No. 10,412,204.

(30) Foreign Application Priority Data

Dec. 20, 2016 (CN) ..................... 2016 2 1406333 U (51) Int. Cl.
| | |
|---|---|
| *H04N 5/225* | (2006.01) |
| *H04M 1/02* | (2006.01) |
| *H04N 5/232* | (2006.01) |
| *G06F 1/16* | (2006.01) |
| *H04N 7/14* | (2006.01) |

(52) U.S. Cl.
CPC ........ *H04M 1/0264* (2013.01); *G06F 1/1686* (2013.01); *H04M 1/0277* (2013.01); *H04N 5/2252* (2013.01); *H04N 5/2257* (2013.01); *H04N 5/2258* (2013.01); *H04N 5/232* (2013.01); *H04N 5/23248* (2013.01); *H04N 5/23258* (2013.01); *H04N 2007/145* (2013.01)

(58) Field of Classification Search
CPC .................................................... H04N 5/2252
USPC ......................................................... 348/374
See application file for complete search history.

(56) References Cited

U.S. PATENT DOCUMENTS

2010/0277640 A1* 11/2010 Cao ...................... H04N 5/2251
                                                                    348/374

* cited by examiner

*Primary Examiner* — Joel W Fosselman
(74) *Attorney, Agent, or Firm* — Hodgson Russ LLP (57) ABSTRACT

A housing assembly includes: a support including a peripheral side wall and a lug, the peripheral side wall defining a first accommodating space configured to accommodate a dual-camera assembly, and the lug being connected to an outer peripheral side of the peripheral side wall away from the first accommodating space; and a middle frame having a second accommodating space and a groove in communication with the second accommodating space, the support being accommodated in the second accommodating space, and the lug being fitted with the groove. The present disclosure further provides a dual-camera module and a mobile terminal.

20 Claims, 6 Drawing Sheets

HOUSING ASSEMBLY, DUAL-CAMERA MODULE AND MOBILE TERMINAL

CROSS-REFERENCE TO RELATED APPLICATIONS

This application is a continuation of U.S. application Ser. No. 15/802,697, filed Nov. 3, 2017, which claims priority to Chinese Patent Application No. 201621406333.5, filed Dec. 20, 2016, the entire disclosures of which are incorporated herein by reference.

FIELD

The present disclosure relates to a technical field of communication equipment, and particularly, to a housing assembly, a dual-camera module and a mobile terminal.

BACKGROUND

At present, with a wider application range of a smart phone, more and more internal functional modules are provided in the mobile phone in a high integrated level. Since the mobile phone is often in a moving or shaking state, various functional modules in the mobile phone need to be stabilized.

SUMMARY

In one aspect, the housing assembly is provided, and includes: a support including a peripheral side wall and a lug, the peripheral side wall defining a first accommodating space configured to accommodate a dual-camera assembly, and the lug being connected to an outer peripheral side of the peripheral side wall away from the first accommodating space; and a middle frame having a second accommodating space and a groove in communication with the second accommodating space, the support being accommodated in the second accommodating space, and the lug being fitted with the groove.

In another aspect, the dual-camera module is provided and includes the dual-camera assembly and the above housing assembly, the dual-camera assembly being accommodated in the first accommodating space.

In still another aspect, the mobile terminal is provided, and includes a mainboard and the above dual-camera module, the mainboard being fixed to the middle frame and electrically connected to the dual-camera assembly.

BRIEF DESCRIPTION OF THE DRAWINGS

In order to more clearly illustrate technical solutions of the present disclosure, drawings used in description of the embodiments will be briefly described below. Obviously, the drawings in the following description merely involve some embodiments of the present disclosure, and it will be apparent to those skilled in the art that other drawings can be obtained based on these drawings without creative efforts.

DETAILED DESCRIPTION

Embodiments of the present disclosure will be described with reference to the accompanying drawings.

As FIGS. 1 to 5 illustrated, embodiments of the present disclosure provide a mobile terminal 100. The mobile terminal 100 includes a mainboard 1 and a dual-camera module. The dual-camera module includes a dual-camera assembly 2 and a housing assembly 3. The housing assembly 3 includes a support 31 and a middle frame 32. The support 31 includes a peripheral side wall 311 and a lug 312, the peripheral side wall 311 defines a first accommodating space 310 configured to accommodate the dual-camera assembly 2, and the lug 312 is connected to an outer peripheral side 3111 of the peripheral side wall 311 away from the first accommodating space. The middle frame 32 has a second accommodating space 320 and a groove 321 in communication with the second accommodating space 320, the support 31 is accommodated in the second accommodating space 320, and the lug 312 is fitted with the groove 321.

In this embodiment, the fitting structure of the lug 312 and the groove 321 increases installation accuracy and connection firmness when the support 31 is installed to the middle frame 32, such that the dual-camera assembly 2 accommodated in the support 31 is fixed relative to the middle frame 32. Thus, the housing assembly 3 can stabilize the dual-camera assembly 2, prevent the dual-camera assembly 2 from shaking or falling off relative to the middle frame 32 during use of the mobile terminal 100, and prolong service life of the dual-camera assembly 2.

The dual-camera assembly 2 of the dual-camera module is accommodated in the first accommodating space 310. The mainboard 1 of the mobile terminal 100 is fixed to the middle frame 32 and electrically connected with the dual-camera assembly 2. The mobile terminal 100 can be a mobile phone, a notebook computer, a tablet computer or other electronic devices.

It could be understood that a shape of the outer peripheral side 3111 of the peripheral side wall 311 matches a shape of an inner peripheral side 3201, configured to define the second accommodating space 320, of the middle frame 32, such that the support 31 can be accommodated in the second accommodating space 320. A small gap is defined between the outer peripheral side 3111 of the peripheral side wall 311 and the inner peripheral side 3201 of the middle frame 32, so as to reduce difficulty of installing the support 31 into the middle frame 32, to avoid mutual abrasion during the installation, and to achieve initial position limit to each other. When the lug 312 is fitted with the groove 321, at least two joint surfaces are formed to achieve the mutual position limit.

As an optional embodiment, the support 31 is made of a metal material. The support 31 made of the metal material has high strength and good toughness, and the peripheral side wall 311 has a small thickness and is able to save space, facilitating lighting and thinning of the mobile terminal 100. The lug 312 is grounded. After the support 31 is grounded through the lug 312, electric potential is lowered, and interference with an antenna electromagnetic signal can be reduced, improving user experience of the mobile terminal 100.

The support 31 can adopt an aluminum alloy material, a silver material, an iron material or the like. The support 31 is molded through an automatic numerical control milling process acted on a metal block, i.e. a molding dimension of the peripheral side wall 311 and a molding dimension of the lug 312 are both realized through the numerical control milling process, such that the peripheral side wall 311 and the lug 312 have high dimensional precision. In this embodiment, the peripheral side wall 311 and the lug 312 are integrally molded. In another embodiment, the lug 312 can be connected to the peripheral side wall 311 by welding, screw joint or other ways.

Figure 1:
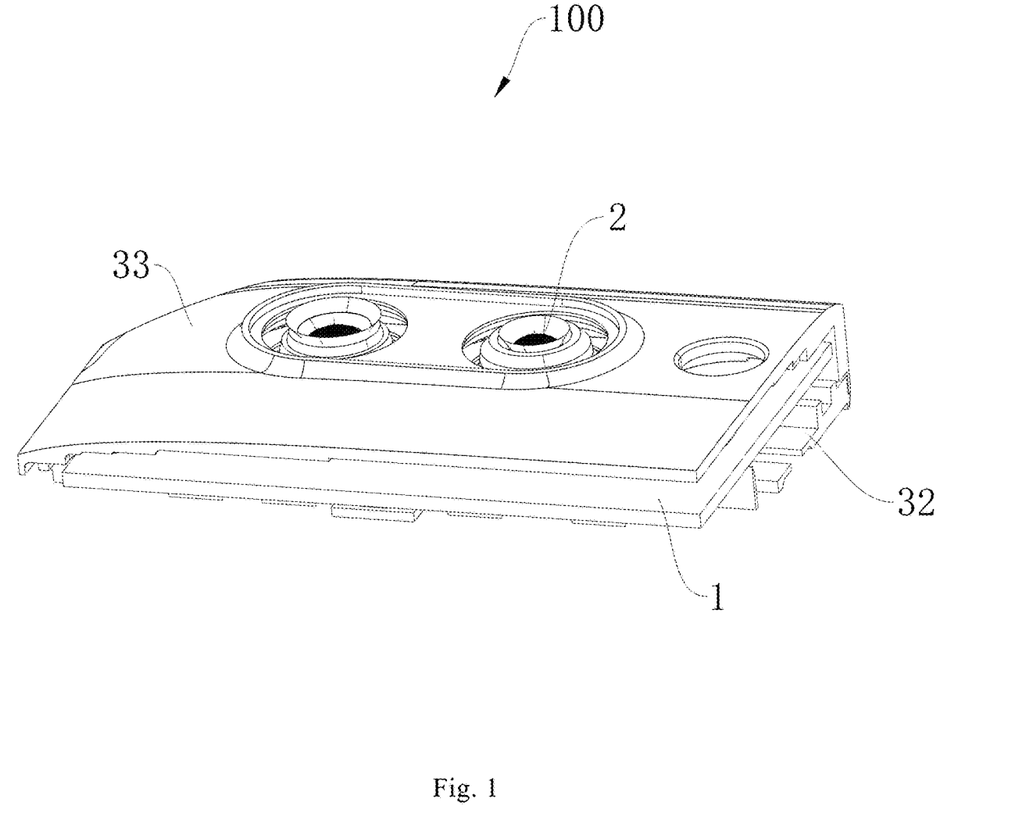
FIG. 1 illustrates a schematic view of a mobile terminal according to embodiments of the present disclosure.
Figure 2:
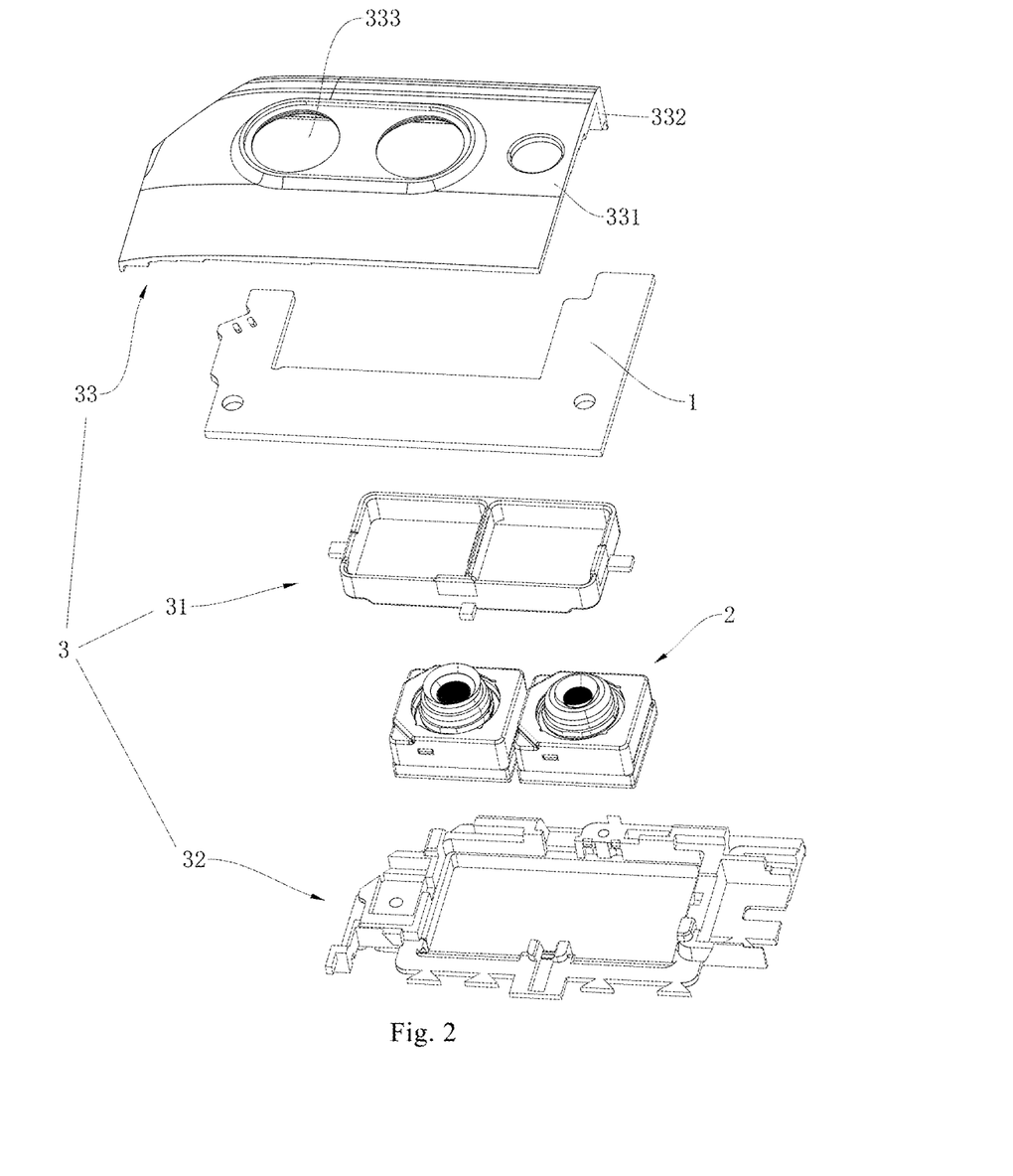
FIG. 2 illustrates an exploded view of the mobile terminal shown in FIG. 1.
Figure 3:
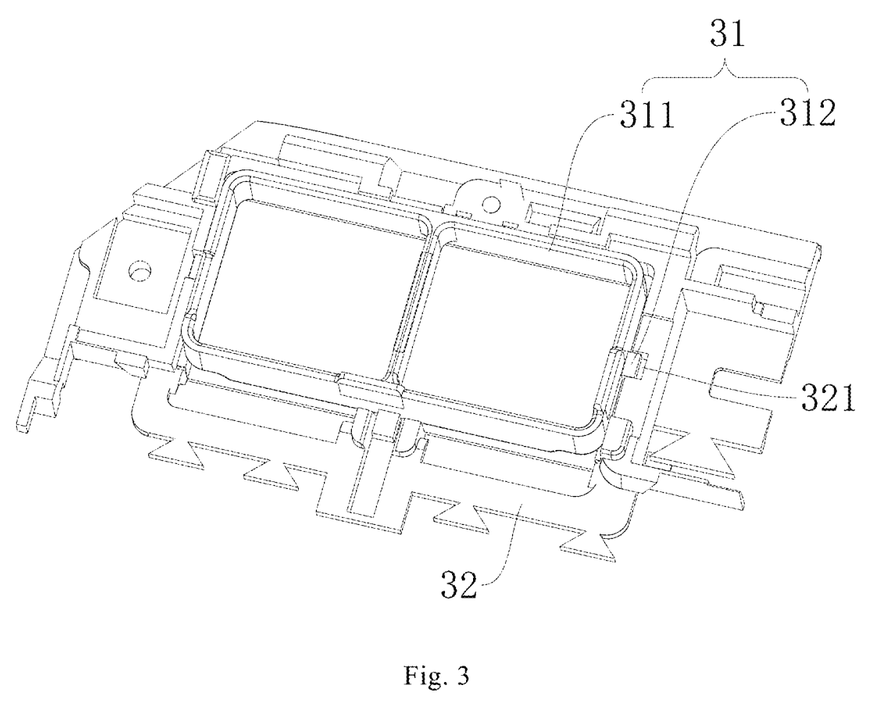
FIG. 3 illustrates a partially schematic view of the mobile terminal shown in FIG. 1.
Figure 4:
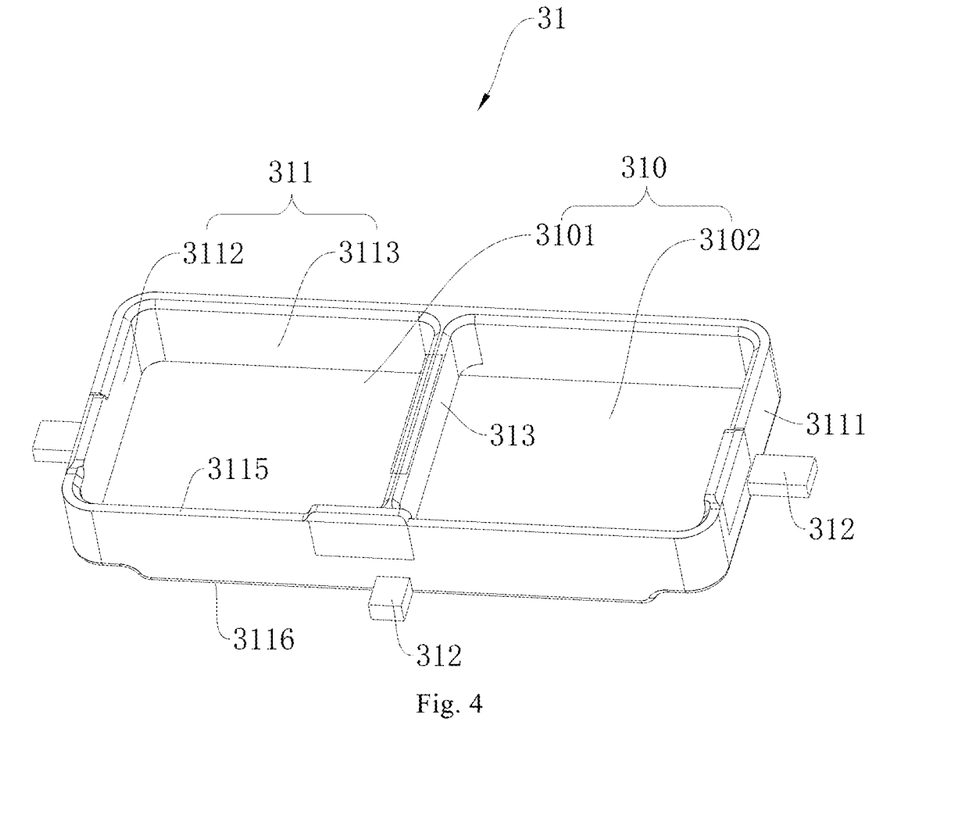
FIG. 4 illustrates a schematic view of a support of the mobile terminal shown in FIG. 1.
Figure 5:
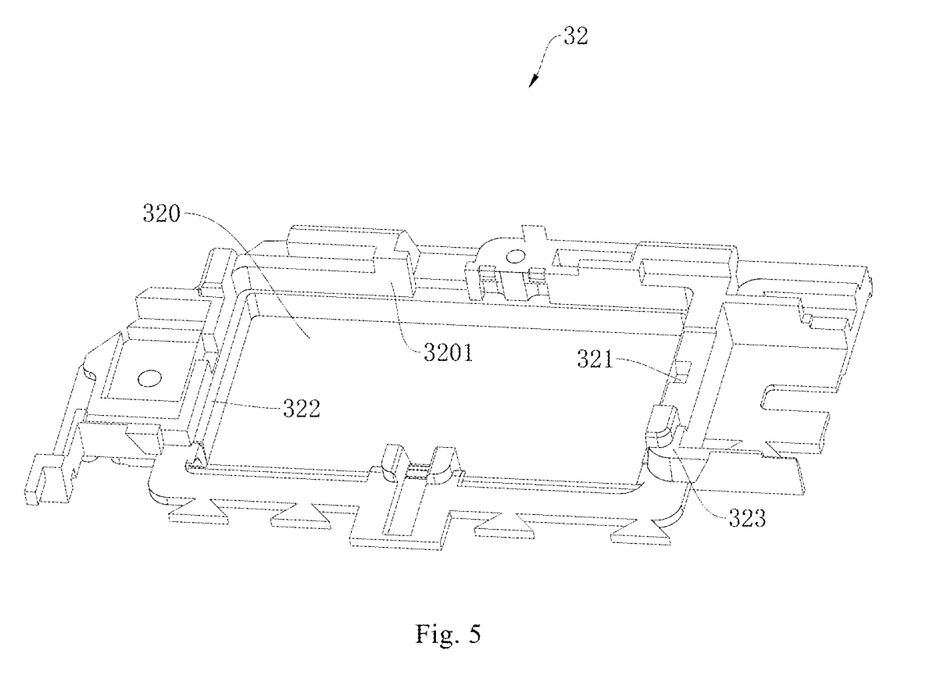
FIG. 5 illustrates a schematic view of a middle frame of the mobile terminal shown in FIG. 1.

As FIGS. 3 to 5 illustrated, as an optional embodiment, at least two lugs 312 are provided, and the lugs 312 are spaced apart and connected to the peripheral side wall 311. The lugs 312 are spaced apart and connected to the outer peripheral side 3111 at a plurality of positions, so as to limit the peripheral side wall 311 from a plurality of directions and hence enhance the connection firmness when the support 31 is installed to the middle frame 32. At this time, at least two grooves 321 are also provided, and the number and positions of the grooves 321 matches those of the lugs 312.

In an embodiment, the lugs 312 can be arranged substantially uniformly around the outer peripheral side 3111 of the peripheral side wall 311, and a position of the peripheral side wall 311 is limited at multiple points which are distributed relatively uniformly in a circumferential direction to make the support 31 stressed uniformly in the circumferential direction.

Certainly, in other embodiments, the lugs 312 are arranged more densely at a region where the peripheral side wall 311 is highly stressed, and the lugs 312 are arranged sparsely at a region where the peripheral side wall 311 is lightly stressed.

As shown in FIG. 4, as an optional embodiment, the peripheral side wall 311 includes two short walls 3112 arranged opposite to each other and two opposite long walls 3113 connected between the two short walls 3112, at least one of the short walls 3112 is provided with the lug 312, and at least one of the long walls 3113 is provided with the lug 312.

In this embodiment, at least one of the short walls 3112 is provided with the lug 312, such that a position of the support 31 is limited in an extension direction of the short wall 3112; at least one of the long walls 3113 is provided with the lug 312, such that the position of the support 31 is limited in an extension direction of the long wall 3113. The extension direction of the short wall 3112 intersects the extension direction of the long wall 3113, such that the position of the support 31 is limited in at least two crossed directions and the support 31 is fixed relative to the middle frame 32.

In an embodiment, the two short walls 3112 and the two long walls 3113 are all provided with the lugs 312. In another embodiment, one short wall 3112 is provided with the lug 312, and the two long walls 3113 are provided with the lugs 312. In still another embodiment, the two short walls 3112 are provided with the lugs 312, and one long wall 3113 is provided with the lug 312.

Optionally, each short wall 3112 is provided with at least one lug 312, and each long wall 3113 is provided with at least one lug 312.

Figure 6:
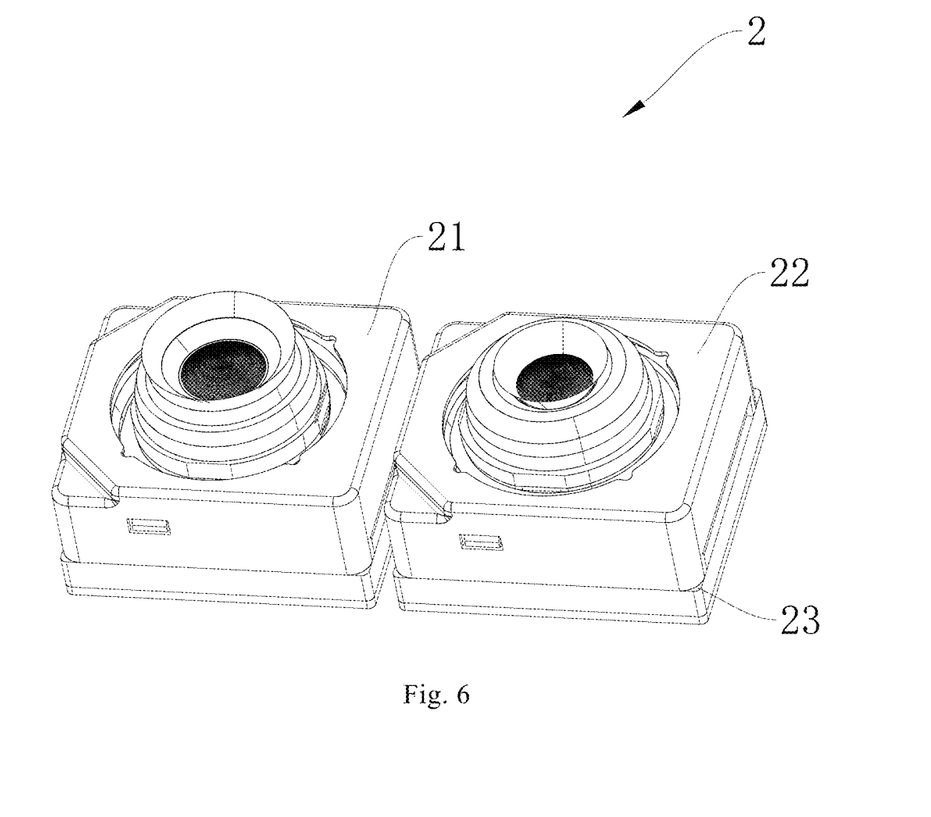
FIG. 6 illustrates a schematic view of a dual-camera assembly of the mobile terminal shown in FIG. 1.

As FIGS. 4 and 6 illustrated, as an optional embodiment, the support 31 further includes a partition wall 313 connected between the two long walls 3113 and configured to divide the first accommodating space 310 into two accommodating sub-spaces 3101 and 3102. The dual-camera assembly 2 includes a first camera assembly 21 and a second camera assembly 22, the first camera assembly 21 is accommodated in one accommodating sub-space 3101, and the second camera assembly 22 is accommodated in the other accommodating sub-space 3102. The partition wall 313 partitions the first camera assembly 21 from the second camera assembly 22 to avoid mutual collision between the first camera assembly 21 and the second camera assembly 22. Meanwhile, the partition wall 313 can enhance the firmness of the support 31, and reduce a risk of squeezing the dual-camera assembly 2 due to deformation of the support 31 under the action of an external force.

The partition wall 313 and the peripheral side wall 311 are integrally molded. Alternatively, the partition wall 313 is connected to the peripheral side wall 311 by welding, screw joint or other ways.

Optionally, the lug 312 provided to the long wall 3113 is disposed directly facing the partition wall 313, that is, the lug 312 is connected at the intersection of the long wall 3113 and the partition wall 313. Since the structural strength at the intersection of the long wall 3113 and the partition wall 313 is high, the lug 312 provided at the intersection is able to limit the position of the peripheral side wall 311, and deformation of the peripheral side wall 311 due to an excessive acting force produced by position limiting is avoided.

As FIGS. 2 to 6 illustrated, as an optional embodiment, the middle frame 32 has a position limiting step 322 protruding towards the second accommodating space 320. The peripheral side wall 311 further includes an upper end surface 3115 and a lower end surface 3116 disposed opposite to each other, and the upper end surface 3115 and the lower end surface 3116 are both connected to the outer peripheral side 3111. The end surface (the upper end surface 3115 or the lower end surface 3116) of the peripheral side wall 311 abuts against the position limiting step 322. The position limiting step 322 is configured to limit the position of the support 31 and support the support 31.

Optionally, the dual-camera assembly 2 is provided a blocking step 23 in a circumferential side, and the end surface (the upper end surface 3115 or the lower end surface 3116) of the peripheral side wall 311 abuts against the blocking step 23. The peripheral side wall 311 limits the position of the dual-camera assembly 2 through the blocking step 23.

In an embodiment, the lower end surface 3116 of the peripheral side wall 311 abuts against the blocking step 23, an upper portion of the dual-camera assembly 2 is accommodated in the first accommodating space 310, and a lower portion of the dual-camera assembly 2 extends out of the first accommodating space 310. The position limiting step 322 is located at a lower part of the second accommodating space 320 of the middle frame 32. The support 31 and the dual-camera assembly 2 are both accommodated in the second accommodating space 320, the lower end surface 3116 of the peripheral side wall 311 abuts against the position limiting step 322, the position of the support 31 is limited at an upper part of the second accommodating space 320, and the lower portion of the dual-camera assembly 2 is accommodated in the lower part of the second accommodating space 320. In this embodiment, the support 31 presses the dual-camera assembly 2 to a certain position limiting zone (the lower part of the second accommodating space 320) of the middle frame 32, thereby further stabilizing the dual-camera assembly 2.

Certainly, in other embodiments, the upper end surface 3115 of the peripheral side wall 311 abuts against the blocking step 23, and the position limiting step 322 is located at the upper part of the second accommodating space 320. The upper portion of the dual-camera assembly 2 extends out of the first accommodating space 310, and the lower portion of the dual-camera assembly 2 is accommodated in the first accommodating space 310. The support 31 and the dual-camera assembly 2 are both accommodated in the second accommodating space 320, the upper end surface 3115 of the peripheral side wall 311 abuts against the position limiting step 322, the position of the support 31 is limited at the lower part of the second accommodating space 320, and the upper portion of the dual-camera assembly 2 is accommodated in the upper part of the second accommodating space 320. In this embodiment, the support 31 presses the dual-camera assembly 2 to the upper part of the second accommodating space 320 to limit the position of the dual-camera assembly 2.

It could be understood that the groove 321 is in communication with a region of the second accommodating space 320 where the position limiting step 322 is not provided, so as to facilitate the installation of the support 31 to the middle frame 32.

As FIGS. 1 to 4 illustrated, as an optional embodiment, the housing assembly 3 further includes a rear cover 33, and the rear cover 33 covers the middle frame 32. The peripheral side wall 311 is located between the position limiting step 322 and the rear cover 33. The rear cover 33 includes a top wall 331 and a side wall 332 surrounding the top wall 331, and the side wall 332 abuts against the middle frame 32 to realize closure. A through hole 333 is provided at a position of the rear cover 33 directly facing the two accommodating sub-spaces 3101 and 3102, to reveal the dual-camera assembly 2.

Optionally, the mainboard 1 is provided between the rear cover 33 and the top wall 331 of the rear cover 33. The mainboard 1 is fixed to an upper end surface 323 of the middle frame 32.

In an embodiment, a side of the lug 312 away from the groove 321 abuts against a ground pole of the mainboard 1 through a conductive part, such that the support 31 is grounded, and the electric potential is lowered to reduce the interference with the antenna electromagnetic signal, thereby improving the user experience. The conductive part can be a conductive sponge or a metal elastic part.

In an embodiment, the through hole 333 can include two through sub-holes spaced apart, and the through sub-holes are substantially circular. In another embodiment, the through hole 333 can be a single hole exhibiting a runway circular shape.

Embodiments of the present disclosure have been described in detail, and principles and embodiments of the present disclosure have been elaborated with reference to specific examples, but the description of the above embodiments is merely used to assist in understanding the present disclosure and its core idea; meanwhile, it is conceivable for those skilled in the art to make changes in the specific embodiments and application areas according to the idea of the present disclosure. In conclusion, the description should not be construed to limit the present disclosure.

What is claimed is:

1. A housing assembly, comprising:
   a support comprising a peripheral side wall and a lug, the peripheral side wall defining a first accommodating space, and the lug being connected to an outer peripheral side of the peripheral side wall away from the first accommodating space; and
   a middle frame having a second accommodating space and a groove in communication with the second accommodating space, the support being accommodated in the second accommodating space, and the lug being fitted with the groove;
   wherein the lugs are arranged substantially uniformly around the outer peripheral side of the peripheral side wall.

2. The housing assembly according to claim 1, wherein a shape of an inner peripheral side of the middle frame enclosing the second accommodating space is consistent with a shape of the outer peripheral side of the peripheral side wall.

3. The housing assembly according to claim 2, wherein a gap is defined between the outer peripheral side of the peripheral side wall and the inner peripheral side of the middle frame.

4. The housing assembly according to claim 1, wherein the lug is connected to the peripheral side wall by screw joint.

5. The housing assembly according to claim 1, wherein the number of the groove is consistent with the number of the lug.

6. The housing assembly according to claim 1, wherein the peripheral side wall comprises two first walls arranged opposite to each other and two opposite long walls connected between the two first walls, at least one of the first walls is provided with the lug, and at least one of the second walls is provided with the lug.

7. The housing assembly according to claim 6, wherein one first wall is provided with the lug, and the two second walls are both provided with the lug.

8. The housing assembly according to claim 6, wherein the two first walls are both provided with the lug, and one second wall is provided with the lug.

9. The housing assembly according to claim 6, each first wall is provided with at least one lug, and each second wall is provided with at least one lug.

10. The housing assembly according to claim 6, wherein the support further comprises a partition wall connected between the two second walls and configured to divide the first accommodating space into two accommodating sub-spaces.

11. The housing assembly according to claim 10, wherein the partition wall is connected to the peripheral side wall by screw joint.

12. The housing assembly according to claim 10, wherein the lug is connected at the intersection of the second wall and the partition wall.

13. A dual-camera module, comprising a dual-camera assembly and a housing assembly, the housing assembly comprising:
   a support comprising a peripheral side wall and a lug, the peripheral side wall defining a first accommodating space configured to accommodate the dual-camera assembly, and the lug being connected to an outer peripheral side of the peripheral side wall away from the first accommodating space; and
   a middle frame having a second accommodating space and a groove in communication with the second accommodating space, the support being accommodated in the second accommodating space, and the lug being fitted with the groove,
   the dual-camera assembly being accommodated in the first accommodating space;
   wherein the lug is provided at a first region in a first arrangement manner, and provided at a second region in a second arrangement manner, the first region is more highly stressed than the second region, and the lug is arranged more densely in the first arrangement manner than in the second arrangement.

14. The housing assembly according to claim 13, wherein the peripheral side wall comprise two first walls arranged opposite to each other and two opposite second walls connected between the two first walls, at least one of the first walls is provided with the lug, and at least one of the second walls is provided with the lug.

15. The housing assembly according to claim 14, wherein the support further comprises a partition wall connected between the two second walls and configured to divide the first accommodating space into two accommodating sub-spaces.

16. The housing assembly according to claim 15, wherein the dual-camera assembly comprises a first camera assembly and a second camera assembly, the first camera assembly is accommodated in one accommodating sub-space, and the second camera assembly is accommodated in the other accommodating sub-space.

17. A mobile terminal, comprising a mainboard and a dual-camera module, the dual-camera module comprising a dual-camera assembly and a housing assembly, the housing assembly comprising:
a support comprising a peripheral side wall and a lug, the peripheral side wall defining a first accommodating space configured to accommodate the dual-camera assembly, and the lug being connected to an outer peripheral side of the peripheral side wall away from the first accommodating space; and
a middle frame having a second accommodating space and a groove in communication with the second accommodating space, the support being accommodated in the second accommodating space, and the lug being fitted with the groove,
the dual-camera assembly being accommodated in the first accommodating space, and the mainboard being fixed to the middle frame and electrically connected to the dual-camera assembly;
wherein the peripheral side wall comprises two first walls arranged opposite to each other and two opposite second walls connected between the two first walls, at least one of the first walls being provided with the lug, and at least one of the second walls being provided with the lug.

18. The housing assembly according to claim 17, wherein the support further comprises a partition wall connected between the two second walls and configured to divide the first accommodating space into two accommodating sub-spaces.

19. The housing assembly according to claim 17, wherein a side of the lug away from the groove abuts against a ground pole of the mainboard through a conductive part.

20. The housing assembly according to claim 17, wherein the middle frame has a position limiting step protruding towards the second accommodating space, the peripheral side wall further comprises an upper end surface and a lower end surface disposed opposite to each other, and the upper end surface abuts against the position limiting step.

* * * * *